United States Patent
Koga (10) Patent No.: US 7,735,113 B2
(45) Date of Patent: Jun. 8, 2010

(54) RECEIVING APPARATUS, AND DISPLAY APPARATUS AND TELEVISION BROADCASTING SYSTEM THEREWITH

(75) Inventor: Fumiaki Koga, Neyagawa (JP)

(73) Assignee: Panasonic Corporation, Osaka (JP)

( * ) Notice: Subject to any disclaimer, the term of this patent is extended or adjusted under 35 U.S.C. 154(b) by 945 days.

(21) Appl. No.: 10/551,129

(22) PCT Filed: Mar. 31, 2004

(86) PCT No.: PCT/JP2004/004652

§ 371 (c)(1),
(2), (4) Date: Sep. 6, 2006

(87) PCT Pub. No.: WO2004/091212

PCT Pub. Date: Oct. 21, 2004

(65) Prior Publication Data

US 2007/0040947 A1    Feb. 22, 2007

(30) Foreign Application Priority Data

Apr. 3, 2003    (JP) .............................. 2003-100033

(51) Int. Cl.
*H04N 7/16* (2006.01)
(52) U.S. Cl. ........................ 725/152; 725/131; 348/725; 348/730
(58) Field of Classification Search .................. 725/33, 725/151, 152, 131, 132; 348/725, 730
See application file for complete search history.

(56) References Cited

U.S. PATENT DOCUMENTS

| 5,673,088 | A | * | 9/1997 | Nah ............................ 348/555 |
| 6,556,133 | B2 | | 4/2003 | Ogura | |
| 2001/0041551 | A1 | | 11/2001 | Rotzoll | |
| 2002/0152473 | A1 | * | 10/2002 | Unger ......................... 725/120 |
| 2003/0216133 | A1 | * | 11/2003 | Poltorak ................... 455/404.1 |
| 2004/0268392 | A1 | * | 12/2004 | Tanaka ......................... 725/42 |
| 2006/0082690 | A1 | * | 4/2006 | Englert ....................... 348/731 |

FOREIGN PATENT DOCUMENTS

| EP | 1 238 467 | 9/2002 |
| JP | 60-39986 | 3/1985 |
| JP | 11-196405 | 7/1999 |
| JP | 11-317713 | 11/1999 |
| JP | 2000-307449 | 11/2000 |
| JP | 2001-116939 | 4/2001 |
| WO | 02/30130 | 4/2002 |

* cited by examiner

*Primary Examiner*—Ngoc K. Vu
(74) *Attorney, Agent, or Firm*—Wenderoth, Lind & Ponack, L.L.P.

(57) ABSTRACT

During sleep mode, a power-source control section stops the power supply to a tuner, a demodulation section, an AV-data processing section and a microcomputer, and delivers a power supply only to a standby tuner. The standby tuner receives a start signal which is transmitted from a head end, using a frequency except a specific frequency which is received by the tuner, and outputs a power-supply instruction signal according to the start signal. The power-source control section executes a power supply to the tuner, the demodulation section, the AV-data processing section and the microcomputer, in response to the power-supply instruction signal.

16 Claims, 7 Drawing Sheets

RECEIVING APPARATUS, AND DISPLAY APPARATUS AND TELEVISION BROADCASTING SYSTEM THEREWITH

BACKGROUND OF THE INVENTION

1. Technical Field

The present invention relates to a receiving apparatus which receives a broadcast signal from a broadcasting-station apparatus, and a display apparatus and a television broadcasting system in which this receiving apparatus is used. It relates to, for example, a receiving apparatus which receives a broadcast signal from a head-end apparatus of a CATV (or cable television) station, and a display apparatus and a CATV system in which this receiving apparatus is used.

2. Background Art

In the United States, a CATV system has become popular which can broadcast through a large number of channels. Also, a digital broadcasting method has enabled high-definition broadcasting using a lot of channels. As such a CATV system, for example, Japanese patent application Laid-Open No. 2002-308030 discloses the following CATV system. In order to realize power savings in terminal equipment such as a receiving apparatus, there are provided a head end which transmits downstream data, and terminal equipment which receives downstream data that is transmitted from the head end. The terminal includes a tuner, a demodulation circuit, a CPU (or central processing unit) and a switch circuit. The CPU turns on the switch circuit at a predetermined time to turn on the power of the tuner and the demodulation circuit.

However, in this terminal, the CPU needs to turn the switch circuit on and off. Even in a sleep mode where no cable broadcast is supposed to be received, the CPU's power is required to be turned on. Hence, in the terminal equipment power consumption cannot be reduced enough during sleep mode.

In addition, when the terminal equipment is in a power-on mode, or when its power is turned on, downstream data for turning on or off the switch circuit needs to be transmitted from the head end. Thus, such downstream data for turning on or off the switch circuit cannot be transmitted at an arbitrary time.

BRIEF SUMMARY OF THE INVENTION

It is an object of the present invention to provide a receiving apparatus which is capable of reducing power consumption sufficiently by switching a power-supply state at any time, and a display apparatus and a television broadcasting system with the receiving apparatus.

It is another object of the present invention to provide a receiving apparatus which is capable of reducing power consumption enough in sleep mode, and receiving a start signal for switching from sleep mode to a power-on mode at an arbitrary time, and a display apparatus and a television broadcasting system in which the same apparatus is used.

A receiving apparatus according to an aspect of the present invention includes: a first receiving means for receiving a signal with a broadcast carrier frequency which is transmitted from a broadcasting-station apparatus; a power-supply controlling means for controlling a power supply to the first receiving means; and a second receiving means for receiving an operation signal which is transmitted from the broadcasting-station apparatus, using a frequency different from the broadcast carrier frequency, in which the second receiving means outputs a power-supply control signal to the power-supply controlling means, according to the operation signal, and the power-supply controlling means controls a power supply to the first receiving means, according to the power-supply control signal.

In this receiving apparatus, the second receiving means receives an operation signal which is transmitted from the broadcasting-station apparatus, using a frequency different from the broadcast carrier frequency which is received by the first receiving means. According to the operation signal which it has received, the second receiving means outputs a power-supply control signal. According to the power-supply control signal, the power-supply controlling means controls a power supply to the first receiving means. Therefore, without affecting ordinary broadcasting, or the like, an operation signal can be transmitted at an arbitrary time from the broadcasting-station apparatus. Besides, the power supply to the first receiving means can be controlled, using the operation signal. Hence, the power-supply state of the receiving apparatus can be switched at any time, thus reducing a power consumption sufficiently.

It is preferable that if the power supply to the first receiving means is stopped by the power-supply controlling means, the second receiving means receive a start signal which is transmitted from a broadcasting-station apparatus then using a frequency different from the broadcast carrier frequency as the operation signal, and according to the start signal, output a power-supply instruction signal as the power-supply control signal to the power-supply controlling means. The power-supply controlling means delivers a power supply to the first receiving means, according to the power-supply instruction signal.

In this case, if the power supply to the first receiving means is stopped by the power-supply controlling means, then using a frequency different from the broadcast carrier frequency which is received by the first receiving means, the second receiving means receives a start signal which is transmitted from a broadcasting-station apparatus. According to the start signal which it has received, the second receiving means outputs a power-supply instruction signal. According to the power-supply instruction signal, the power-supply controlling means delivers a power supply to the first receiving means. Therefore, in sleep mode where a broadcast is not received, a power supply is delivered only to the second receiving means, without delivering a power supply to the first receiving means. This helps keep the power consumption of the receiving apparatus to a minimum requirement.

In addition, as the start signal, a signal is used which has a specific frequency that is received by the first receiving means. For example, a signal is used which has a frequency other than a frequency that is used for regular broadcasting and a frequency that is used for downstream data which includes various kinds of information such as an electronic program guide. Therefore, without affecting regular broadcasting, or the like, a start signal can be transmitted at an arbitrary time from a broadcasting-station apparatus.

As a result, in sleep mode where no broadcast is supposed to be received, a power consumption can be reduced enough. Besides, a start signal for switching from a sleep mode to a power-on mode at an arbitrary time can be received. This makes it possible to switch from sleep mode to power-on mode at any time.

Preferably the receiving apparatus should belong to a group which is predetermined from among a plurality of groups and the start signal should include group specification information for specifying the group. If the second receiving means receives, as the start signal, the group specification information for specifying the group to which the receiving apparatus that includes the second receiving means belongs, then the second receiving means should output the power-supply instruction signal to the power-supply controlling means.

In this case, the receiving apparatus can be switched for each group from a sleep mode to a power-on mode. Therefore, for example, downstream data, or the like, can be transmitted at a different time for each group. This helps use traffic efficiently in a cable network.

It is preferable that the start signal include a plurality of carrier signals which are inserted within a frequency band where the broadcast carrier frequency is not yet used. The second receiving means has a plurality of wave-detecting means for detecting each carrier signal, and an extracting means for extracting information which is included in the start signal based on a detection result of the carrier signals by the plurality of wave-detecting means.

In this case, whether or not there is a carrier signal corresponds to digital data, so that information which is included in a start signal can be extracted. This makes it possible to receive various kinds of information as the start signal, using a simple configuration.

Preferably, the extracting means should output the power-supply instruction signal to the power-supply controlling means, if the group specification information coincides with digital data which is made up of the detection result of the carrier signals by the plurality of wave-detecting means.

In this case, according to the group specification information, a power supply can be delivered to the first receiving means. Therefore, for each group which the receiving apparatus belongs to, the time when switching is executed from sleep mode to power-on mode can be arbitrarily set.

Furthermore, the start signal may also include a plurality of carrier signals which are inserted within a frequency band where the broadcast carrier frequency is not yet used. The second receiving means may also have a plurality of filter means for allowing the carrier signals to pass through, the filter means being provided for each carrier signal, a choosing means for choosing and outputting an output of one filter means, one after another, from among the plurality of filter means, a wave-detecting means for detecting a carrier signal, one after another, from an output of the choosing means, and an extracting means for extracting information which is included in the start signal based on a detection result of the carrier signals by the wave-detecting means.

In this case, whether or not there is a carrier signal corresponds to digital data, so that information which is included in a start signal can be extracted. This makes it possible to receive various kinds of information as the start signal, using a simple configuration. Also, a single wave-detecting means can be shared with a plurality of filter means, thus simplifying the circuit configuration of the second receiving means.

Moreover, the start signal may also include a plurality of carrier signals which are inserted within a frequency band where the broadcast carrier frequency is not yet used. The second receiving means may also have a variable filter means for varying a passing frequency band, a controlling means for controlling the passing frequency band of the variable filter means, one after another, so that the plurality of carrier signals pass through one after another, a wave-detecting means for detecting a carrier signal, one after another, from an output of the variable filter means, and an extracting means for extracting information which is included in the start signal based on a detection result of the carrier signals by the wave-detecting means.

In this case, whether or not there is a carrier signal corresponds to digital data, so that information which is included in a start signal can be extracted. This makes it possible to receive various kinds of information as the start signal, using a simple configuration. Also, a plurality of carrier signals can be detected using a variable filter means and a wave-detecting means, thereby simplifying the circuit configuration of the second receiving means.

It is preferable that the start signal further include time information for specifying a time when the first receiving means should be started. The second receiving means extracts the time information which is included in the start signal that the second receiving means receives, and outputs this time information and the power-supply instruction signal to the power-supply controlling means. The power-supply controlling means delivers a power supply to the first receiving means at the time which is specified by the time information.

In this case, according to the time information which is included in the received start signal, a power supply can be delivered to the first receiving means. Therefore, at an arbitrary time after the start signal is transmitted, switching can be executed from sleep mode to power-on mode.

Preferably, the first receiving means should have a tuner section which receives a communication signal with the broadcast carrier frequency, a demodulation section which demodulates a signal that is received by the tuner section, a conversion section which converts a signal that is demodulated by the demodulation section into a visual signal and an audio signal, and a control section which controls an operation of the tuner section, the demodulation section and the conversion section. The power-supply controlling means should stop the power supply to the tuner section, the demodulation section, the conversion section and the control section, at least until the second receiving means receives the start signal.

In this case, while sleep mode, the power supply can be stopped to the tuner section, the demodulation section, the conversion section and the control section. This helps restrain a power consumption in a sleep mode to a minimum requirement.

It is preferable that after delivering a power supply to the first receiving means according to the power-supply instruction signal, the power-supply controlling means stops a power supply to the second receiving means.

In this case, while power-on mode, a power consumption can be kept down to a minimum requirement.

Preferably, if a power supply to the first receiving means is delivered by the power-supply controlling means, the second receiving means should receive a stop signal which is transmitted from a broadcasting-station apparatus using a frequency different from the broadcast carrier frequency as the operation signal, and according to the stop signal, should output a power-supply stop signal as the power-supply control signal to the power-supply controlling means. The power-supply controlling means should stop the power supply to the first receiving means, according to the power-supply stop signal.

In this case, using a frequency different from the broadcast carrier frequency, the second receiving means receives a stop signal which is transmitted from a broadcasting-station apparatus, and outputs a power-supply stop signal. In response to the power-supply stop signal, the power-supply controlling means stops the power supply to the first receiving means. Therefore, when a user forgets to switch the receiving apparatus from power-on mode to sleep mode, or at another such time, the receiving apparatus can be automatically switched from power-on mode to sleep mode. This prevents the receiving apparatus from wasting power.

A display apparatus according to another aspect of the present invention includes a receiving apparatus, and a displaying means for displaying a broadcast image which is received by the receiving apparatus, in which: the receiving apparatus has a first receiving means for receiving a signal with a broadcast carrier frequency which is transmitted from a broadcasting-station apparatus, a power-supply controlling means for controlling a power supply to the first receiving means, and a second receiving means for receiving an operation signal which is transmitted from a broadcasting-station apparatus, using a frequency different from the broadcast carrier frequency. The second receiving means outputs a power-supply control signal to the power-supply controlling means, according to the operation signal, and the power-supply controlling means controls a power supply to the first receiving means, according to the power-supply control signal.

In this display apparatus, the second receiving means receives an operation signal which is transmitted from the broadcasting-station apparatus, using a frequency different from the broadcast carrier frequency which is received by the first receiving means. According to the operation signal which it has received, the second receiving means outputs a power-supply control signal. According to the power-supply control signal, the power-supply controlling means controls a power supply to the first receiving means. Therefore, without affecting ordinary broadcasting or the like, an operation signal can be transmitted at an arbitrary time from the broadcasting-station apparatus. Also, the power supply to the first receiving means can be controlled, using the operation signal. Hence, the power-supply state of the display apparatus can be switched at any time, thus reducing power consumption sufficiently.

It is preferable that if the power supply to the first receiving means is stopped by the power-supply controlling means, the second receiving means receives a start signal which is transmitted from a broadcasting-station apparatus using a frequency different from the broadcast carrier frequency as the operation signal, and according to the start signal, outputs a power-supply instruction signal as the power-supply control signal to the power-supply controlling means. The power-supply controlling means delivers a power supply to the first receiving means, according to the power-supply instruction signal.

In this case, if the power supply to the first receiving means is stopped by the power-supply controlling means, then using a frequency different from the broadcast carrier frequency which is received by the first receiving means, the second receiving means receives a start signal which is transmitted from a broadcasting-station apparatus. According to the start signal which it has received, the second receiving means outputs a power-supply instruction signal. According to the power-supply instruction signal, the power-supply controlling means delivers a power supply to the first receiving means. Therefore, in sleep mode where a broadcast is not received, a power consumption can be sufficiently reduced. Also, a start signal for switching from sleep mode to power-on mode at an optional time can be received. This makes it possible to switch from sleep mode to power-on mode at any time.

Preferably, the power-supply controlling means should stop the power supply to the first receiving means and the displaying means, at least until the second receiving means receives the start signal.

In this case, the power supply to the first receiving means and the displaying means is stopped, at least until the second receiving means receives a start signal. Therefore, in sleep mode where a broadcast is not received, a power supply is delivered only to the second receiving means, without delivering a power supply to the first receiving means and the displaying means. This helps keep the power consumption of the display apparatus to a minimum requirement.

A television broadcasting system according to another aspect of the present invention, which includes a broadcasting-station apparatus that transmits a signal with a broadcast carrier frequency, and a plurality of receiving apparatus that receive a signal which is transmitted from the broadcasting-station apparatus, in which the broadcasting-station apparatus transmits an operation signal to the receiving apparatus, using a frequency different from the broadcast carrier frequency. A receiving apparatus has a first receiving means for receiving the signal with the broadcast carrier frequency which is transmitted from the broadcasting-station apparatus, a power-supply controlling means for controlling a power supply to the first receiving means, and a second receiving means for receiving the operation signal which is transmitted from the broadcasting-station apparatus, using the frequency different from the broadcast carrier frequency. The second receiving means outputs a power-supply control signal to the power-supply controlling means, according to the operation signal, and the power-supply controlling means controls a power supply to the first receiving means, according to the power-supply control signal.

In this television broadcasting system, using a frequency different from the broadcast carrier frequency which is received by the first receiving means, the broadcasting-station apparatus transmits an operation signal to the receiving apparatus. Then, the second receiving means of the receiving apparatus receives the operation signal and outputs a power-supply control signal. According to the power-supply control signal, the power-supply controlling means controls a power supply to the first receiving means. Therefore, without affecting ordinary broadcasting, or the like, the broadcasting-station apparatus can transmit the operation signal at an arbitrary time. Also, the power supply to the first receiving means can be controlled, using the operation signal. Hence, the power-supply state of the receiving apparatus can be switched at any time, thus reducing power consumption sufficiently.

It is preferable that if the power supply to the first receiving means is stopped by the power-supply controlling means, the second receiving means receives a start signal which is transmitted from a broadcasting-station apparatus using a frequency different from the broadcast carrier frequency as the operation signal, and according to the start signal, outputs a power-supply instruction signal as the power-supply control signal to the power-supply controlling means. The power-supply controlling means delivers a power supply to the first receiving means, according to the power-supply instruction signal.

In this case, using a frequency different from the broadcast carrier frequency which is received by the first receiving means, the broadcasting-station apparatus transmits a start signal to the receiving apparatus. In the receiving apparatus, if the power supply to the first receiving means is stopped by the power-supply controlling means, the second receiving means receives the start signal. According to the start signal which it has received, the second receiving means outputs a power-supply instruction signal. According to the power-supply instruction signal, the power-supply controlling means delivers a power supply to the first receiving means. Therefore, in the receiving apparatus, in sleep mode where a broadcast is not received, a power supply is delivered only to the second receiving means, without delivering a power supply to the first receiving means. This helps restrain the power consumption of the receiving apparatus to a minimum requirement.

In addition, as the start signal, a signal is used which has a specific frequency that is received by the first receiving means. For example, a signal is used which has a frequency different from a frequency that is used for regular broadcasting and a frequency that is used for downstream data which includes various kinds of information such as an electronic program guide. Therefore, without affecting regular broadcasting or the like, the broadcasting-station apparatus can transmit the start signal at an arbitrary time. This makes it possible to switch the receiving apparatus from sleep mode to power-on mode at any time.

DETAILED DESCRIPTION OF THE INVENTION

Figure 1:
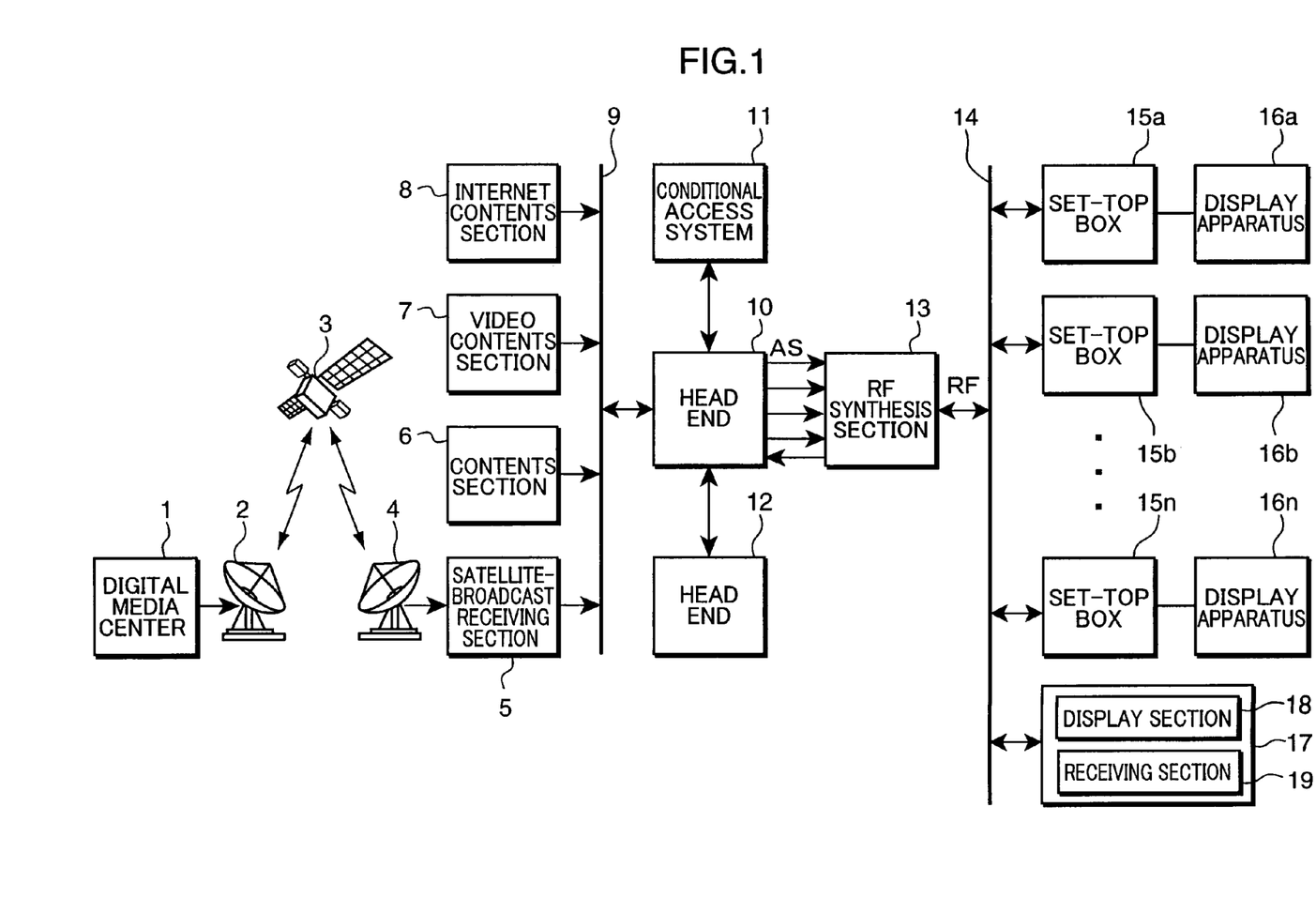
FIG. 1 is a block diagram, showing the configuration of a CATV system in which a head end is used according to an embodiment of the present invention.

Hereinafter, a head end which is used for a CATV system as a receiving apparatus according to an embodiment of the present invention will be described with reference to the drawings. FIG. 1 is a block diagram, showing a configuration of the CATV system which uses the head end according to an embodiment of the present invention.

The CATV system shown in FIG. 1 includes: a digital media center 1; a radio-wave transmitter 2; a broadcasting satellite 3; a radio-wave receiver 4; a satellite-broadcast receiving section 5; a contents section 6; a video contents section 7; an Internet contents section 8; a LAN (or local area network) 9; a head end 10; a conditional access system 11; another head end 12; an RF synthesis section 13; a cable network 14; set-top boxes 15a to 15n; display apparatus 16a to 16n; and a unit display apparatus 17.

Using the radio-wave transmitter 2, the digital media center 1 transmits various digital broadcast waves, or the like, to the broadcasting satellite 3. The satellite-broadcast receiving section 5 receives, using the radio-wave receiver 4, a digital broadcast, or the like, which is relayed by the broadcasting satellite 3.

The satellite-broadcast receiving section 5, the contents section 6, the video contents section 7, the Internet contents section 8 and the head end 10 are connected via the LAN 9, so as to communicate with each other. The head end 10 receives: a digital broadcast signal from the satellite-broadcast receiving section 5; a video signal from the video contents section 7; an Internet data signal from the Internet contents section 8; and a contents signal including other contents, or the like, from the contents section 6. Using an analog broadcasting channel, a digital broadcasting channel and a downstream data channel, it transmits an analog broadcast signal, a digital broadcast signal and downstream data to the RF synthesis section 13. Also, according to control from the conditional access system 11, the head end 10 gives a specific user a CATV service, or it also uses contents from another head end 12.

The RF synthesis section 13, the plurality of set-top boxes 15a to 15n and the unit display apparatus 17 are connected via the cable network 14, so as to communicate with each other. The RF synthesis section 13 synthesizes a digital broadcast signal, an analog broadcast signal and downstream data, and outputs a broadcast signal RF to the plurality of set-top boxes 15a to 15n and the unit display apparatus 17.

The unit display apparatus 17 is a display apparatus which is configured by combining a display section 18 that is formed in the same way as the display apparatus 16a, and the like, and a receiving section 19 that is formed in the same way as the set-top box 15a, and the like. It basically operates similarly to the display apparatus 16a, the set-top box 15a, and the like. Hence, the set-top boxes 15a to 15n and the like will be described below.

Each set-top box 15a to 15n displays a program, information, or the like, which is chosen by a user from among a digital broadcast signal, an analog broadcast signal and downstream data which have been received, using the display apparatus 16a to 16n to which they are connected. Also, using an upstream data channel, each set-top box 15a to 15n transmits upstream data to the head end 10, via the cable network 14 and the RF synthesis section 13.

As described above, an ordinary CATV broadcast is received between the head end 10 and the set-top boxes 15a to 15n. In addition, in order to execute interactive data communication, using an analog broadcasting channel, a digital broadcasting channel, a downstream data channel and an upstream data channel which are predetermined, an analog broadcast signal, a digital broadcast signal, downstream data and upstream data which each have a specific frequency are transmitted and received.

Furthermore, except for an analog broadcast signal, a digital broadcast signal, downstream data and upstream data, the head end 10 uses a frequency other than the above described specific frequency. Thereby, it transmits a start signal AS for switching the set-top boxes 15a to 15n from sleep mode to power-on mode, via the RF synthesis section 13 and the cable network 14, to the set-top boxes 15a to 15n.

Figure 2:
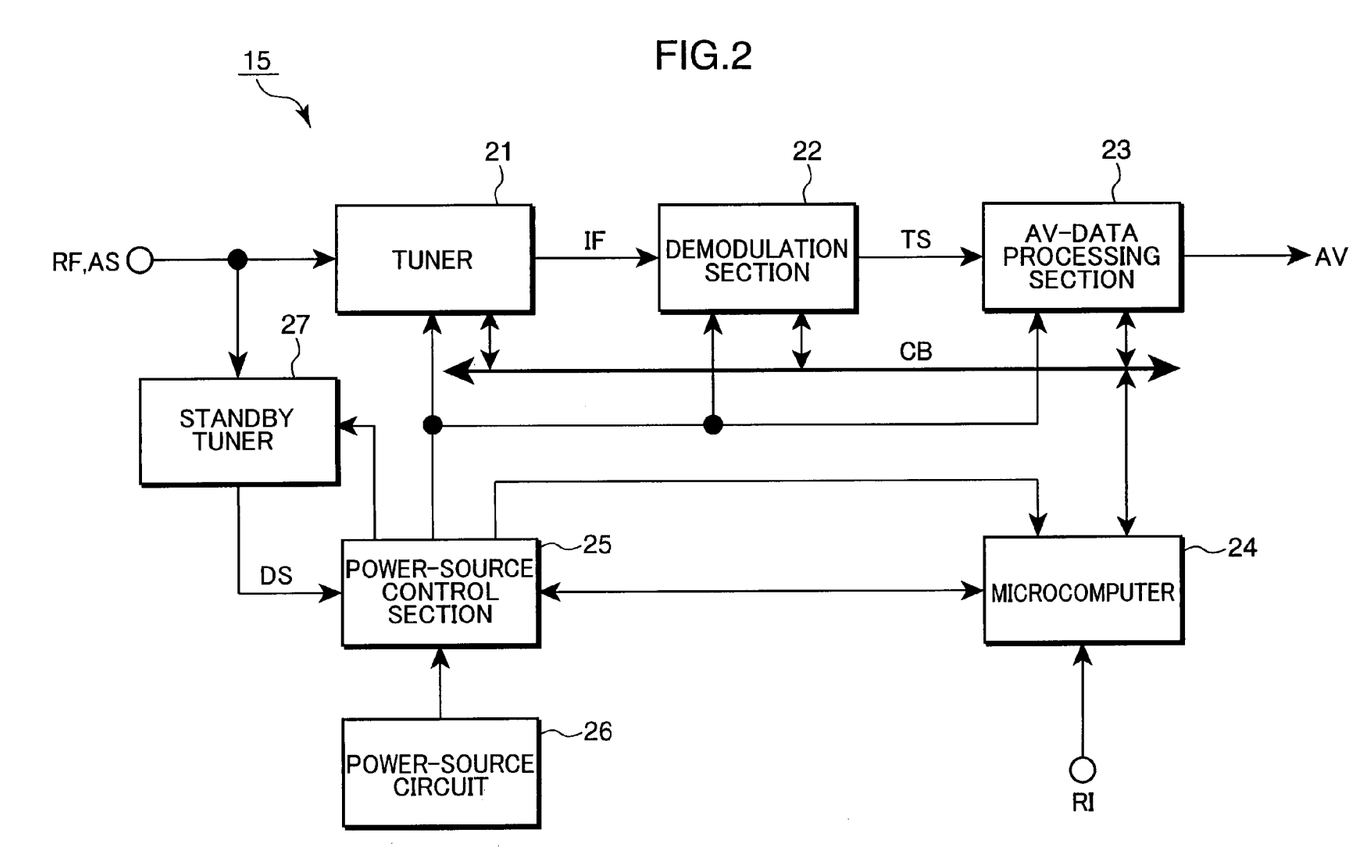
FIG. 2 is a block diagram, showing an example of the configuration of a set-top box shown in FIG. 1.

FIG. 2 is a block diagram, showing an example of the configuration of the set-top boxes 15a to 15n shown in FIG. 1. A set-top box 15 shown in FIG. 2 includes: a tuner 21; a demodulation section 22; an AV-data processing section 23; a microcomputer 24; a power-source control section 25; a power-source circuit 26; and a standby tuner 27. Hereinafter, mainly, a processing for a digital broadcast signal will be described, but an ordinary processing is also executed for downstream data and an analog broadcast signal.

The tuner 21 receives, via the RF synthesis section 13 and the cable network 14, the digital broadcast signal RF which is transmitted from the head end 10. Then, it converts it into an intermediate frequency signal IF. The demodulation section 22 demodulates the intermediate frequency signal IF and outputs a transport stream TS. The AV-data processing section 23 converts the transport stream TS and outputs a visual signal and an audio signal AV. According to an operation signal RI or the like which is outputted from a remote controller (not shown) that is operated by a user, the microcomputer 24 controls, via a control bus CB, the operation of the tuner 21, the demodulation section 22 and the AV-data processing section 23. It also controls the operation of the power-source control section 25.

The power-source circuit 26 generates electric power which is consumed in the set-top box 15 from a commercial power-source. The power-source control section 25 supplies electric power from the power-source circuit 26 to the tuner 21, the demodulation section 22, the AV-data processing section 23 and the microcomputer 24, during power-on mode in which a cable broadcast can be received. It supplies electric power from the power-source circuit 26 to the standby tuner 27, during sleep mode in which a cable broadcast is not supposed to be received.

Via the RF synthesis section 13 and the cable network 14, the standby tuner 27 receives the start signal AS which is transmitted from the head end 10. Then, it outputs a power-supply instruction signal DS to the power-source control section 25. According to the power-supply instruction signal DS, the power-source control section 25 switches the power mode of the set-top box 15 from sleep mode to power-on mode.

Figure 3:
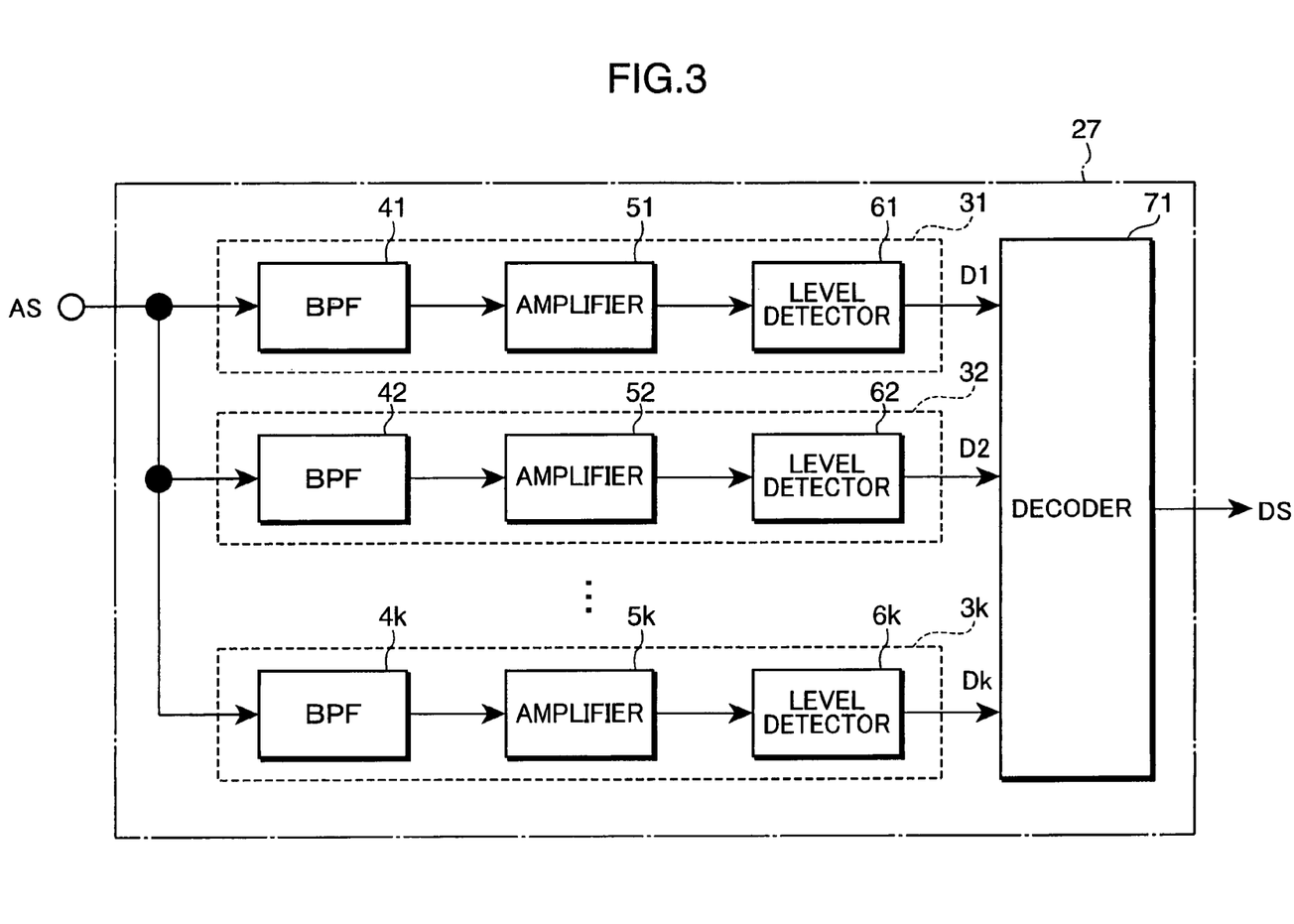
FIG. 3 is a block diagram, showing an example of the configuration of a standby tuner shown in FIG. 2.

FIG. 3 is a block diagram, showing an example of the configuration of the standby tuner 27 shown in FIG. 2. The standby tuner 27 shown in FIG. 3 includes a plurality of carrier detection sections 31 to 3$k$, and a decoder 71.

The carrier detection sections 31 to 3$k$ are provided for k-piece carrier signals C1 to Ck, respectively, which are transmitted from the head end 10 as the start signal AS. The carrier detection section 31 includes a BPF (or band pass filter) 41, an amplifier 51, and a level detector 61. The BPF 41 allows only the carrier signal C1 to pass through. The amplifier 51 amplifies the output of the BPF 41 at a predetermined amplification factor. If the amplified signal is beyond a predetermined level, the level detector 61 outputs a detection-result signal D1. The other carrier detection sections 32 to 3$k$ are also configured in the same way as described above, except for the fact that BPFs 42 to 4$k$ have a different passing band. Hence, they operate in the same way.

According to the above described configuration, if the carrier signal C1 is included in the start signal AS, the carrier detection section 31 outputs the detection-result signal D1 at a high level (i.e., a logic "1"). If the carrier signal C1 is not included in the start signal AS, it outputs the detection-result signal D1 at a low level (i.e., a logic "0"). The other carrier detection sections 32 to 3$k$ also operate in the same way. If the carrier signals C2 to Ck are included in the start signal AS, the detection-result signals D2 to Dk are outputted at a high level (i.e., the logic "1"). On the other hand, if the carrier signals C2 to Ck are not included in the start signal AS, the detection-result signals D2 to Dk are outputted at a low level (i.e., the logic "0"). In this way, the carrier detection sections 31 to 3$k$ outputs, to the decoder 71, the k-bit digital data D1 to Dk which corresponds to whether or not there are the carrier signals C1 to Ck.

The decoder 71 decodes the detection-result signals D1 to Dk which are outputted from the carrier detection sections 31 to 3$k$. If the detection-result signals D1 to Dk are the start signal for switching the set-top box 15 from sleep mode to power-on mode, it outputs the power-supply instruction signal DS. In contrast, if the detection-result signals D1 to Dk are the start signal for switching other set-top boxes 15 from sleep mode to power-on mode, it does not output the power-supply instruction signal DS.

Figure 4:
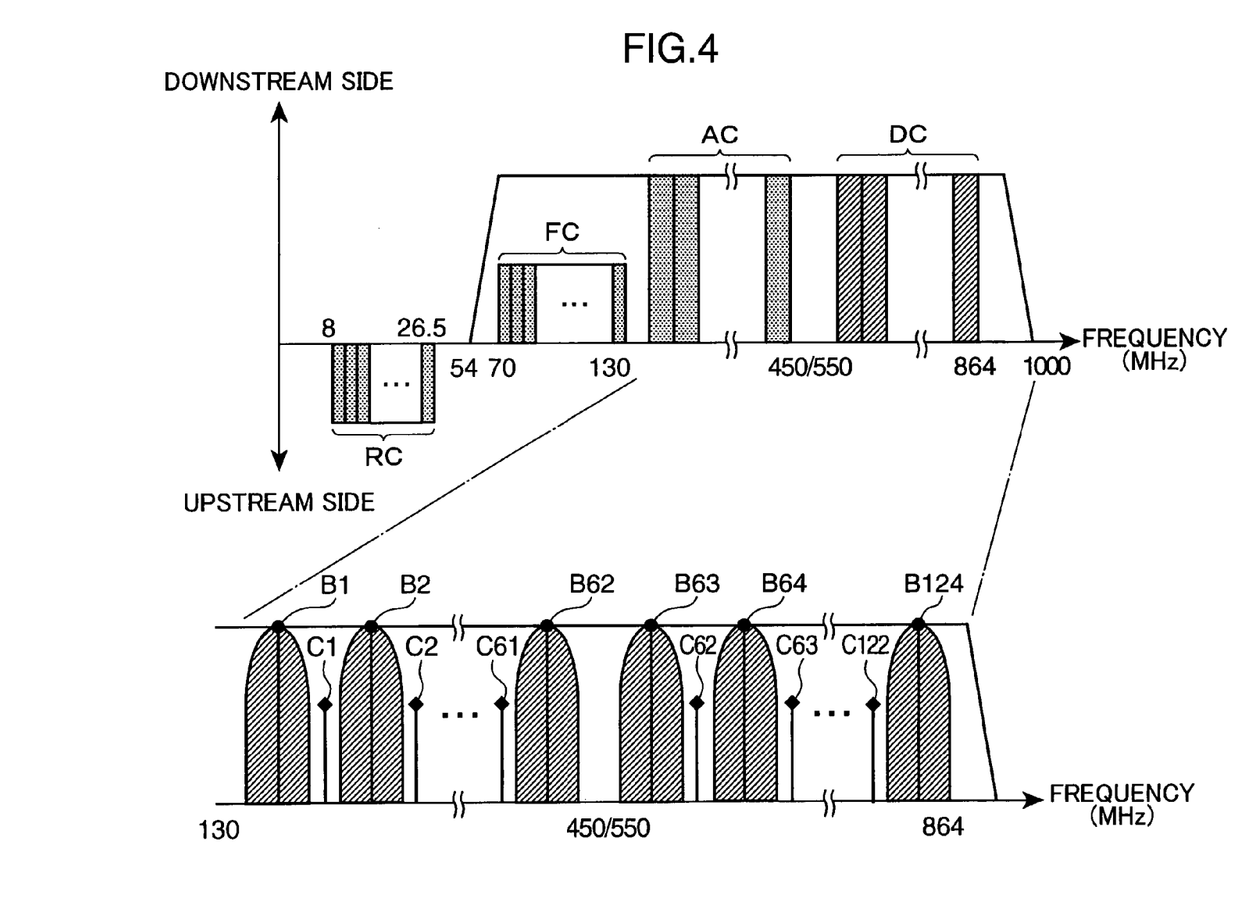
FIG. 4 is an illustration, showing an example of the frequency band of a broadcast signal which is used for CATV broadcasting in the United States.

Herein, the carrier signals C1 to Ck will be described in detail. FIG. 4 is an illustration, showing an example of the frequency band of a broadcast signal which is used for CATV broadcasting in the United States. In the CATV broadcasting of the U.S., as shown on the upper side of FIG. 4, a frequency band RC of 8 to 26.5 MHz is used as its upstream data channel; a frequency band FC of 70 to 130 MHz, as the downstream data channel; a frequency band AC of 130 to 450 MHz, as the analog broadcasting channel; and a frequency band DC of 550 to 864 MHz, as the digital broadcasting channel.

In addition, as shown in the lower part of FIG. 4, the frequency band which is used as each analog broadcasting channel B1 to B62 within the frequency band AC, and the frequency band which is used as each digital broadcasting channel B63 to B124 within the frequency band DC, each have a bandwidth of approximately 6 MHz, as shown by oblique lines. Between adjacent channels, there is an unused frequency band. For example, as shown in the figure, within an unused frequency band between each channel, the carrier signals C1 to C122 are each inserted as the start signal.

Figure 5:
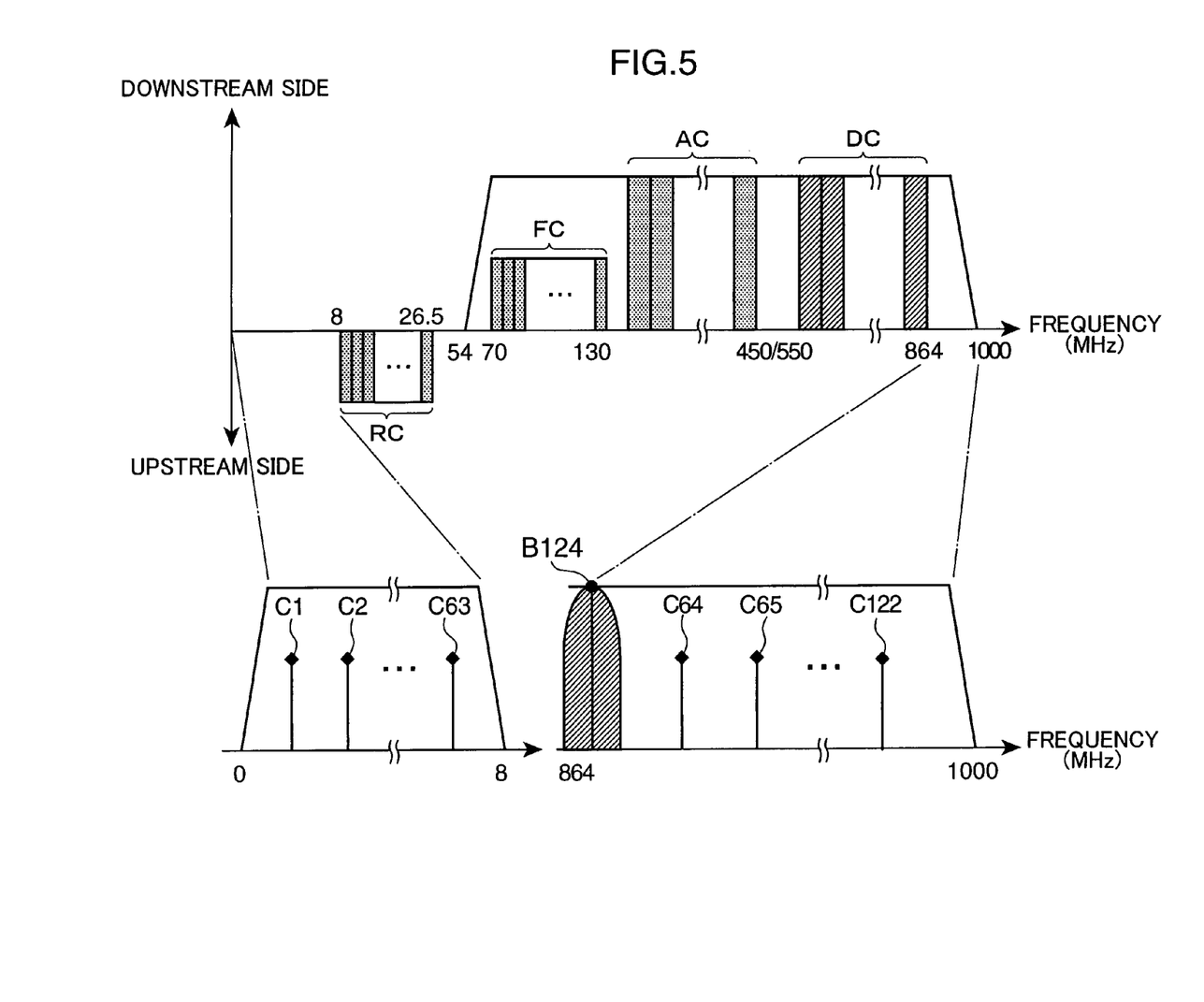
FIG. 5 is an illustration, showing another example of a carrier signal.

FIG. 5 is an illustration, showing another example of the carrier signal. In the example shown in FIG. 5, the carrier signals C1 to C63 are inserted within a frequency band of 0 to 8 MHz which is a frequency band lower than the frequency band RC of 8 to 26.5 MHz that is used for the upstream data channel. Also, the carrier signals C64 to C122 are inserted within a frequency band of 864 to 1000 MHz which is a frequency band higher than the frequency band DC of 550 to 864 MHz that is used for the digital broadcasting channel.

Herein, the frequency band within which such a carrier signal is inserted is not limited especially to the above described examples. It may also be inserted within another frequency band, as long as it is a frequency band other than the frequency band which is used for the CATV broadcasting. Also, even if the carrier signal frequency band is the frequency band which is used for the CATV broadcasting, that frequency band may also be used, unless it is actually being used for CATV broadcasting. Hence, various changes can be made. In addition, not a carrier signal but another signal may also be used as the start signal.

In this embodiment, the tuner 21, the demodulation section 22, the AV-data processing section 23 and the microcomputer 24 correspond to an example of the first receiving means. The power-source control section 25 and the power-source circuit 26 are an example of the power-supply controlling means, and the standby tuner 27 is an example of the second receiving means. Also, the carrier detection sections 31 to 3$k$ correspond to an example of the wave-detecting means; the decoder 71, an example of the extracting means; the tuner 21, an example of the tuner section; the demodulation section 22, an example of the demodulation section; the AV-data processing section 23, an example of the conversion section; and the microcomputer 24, an example of the control section. In addition, the unit display apparatus 17 corresponds to an example of the display apparatus; the display section 18, an example of the displaying means; and the receiving section 19, an example of the receiving apparatus. Furthermore, the head end 10 corresponds to an example of the broadcasting-station apparatus, and the set-top boxes 15$a$ to 15$n$, is an example of the receiving apparatus.

Next, an operation of the CATV system configured as described above will be described in detail. First, the set-top boxes 15$a$ to 15$n$ are grouped into several groups by the serial number of each set-top box or the like. Among them, the set-top box which belongs to a specific group is switched from sleep mode to power-on mode. In this case, an example of such an operation will be described.

For example, let's assume a case in which the set-top boxes 15$a$ to 15$n$ shown in FIG. 1 are grouped into 256 groups by the serial number of each set-top box. Among the carrier signals C1 to C122, eight carrier signals are used, so that 8-bit data can be transmitted as the start signal AS to identify the 256 groups.

As an example, the set-top box which belongs to the 256th group is switched from sleep mode to power-on mode. In this case, the head end 10 outputs all eight carrier signals C1 to C8 as the start signal AS, via the RF synthesis section 13 and the cable network 14, to the set-top box 15. Herein, if the set-top box 15 shown in FIG. 2 belongs to the 256th group, the carrier detection section shown in FIG. 3 is formed by the eight carrier detection sections 31 to 38 which detect the eight carrier signals C1 to C8. The decoder 71 is made up of a plurality of AND gates or the like. Only in the case where all eight inputs are at a high level (i.e., 8-bit data is "1, 1, 1, 1, 1, 1, 1, 1"), it is designed to output the power-supply instruction signal DS at the high level.

At this time, in the set-top box 15, the power supply from the power-source circuit 26 to the tuner 21, the demodulation section 22, the AV-data processing section 23 and the microcomputer 24 is being stopped by the power-source control section 25. Only a power supply is being delivered to the standby tuner 27. Therefore, the carrier detection sections 31 to 38 of the standby tuner 27 detect the eight carrier signals C1 to C8. Then, they output the high-level digital data D1 to D8 to the decoder 71. The decoder 71 decodes the high-level digital data D1 to D8 and outputs the power-supply instruction signal DS to the power-source control section 25.

In response to the power-supply instruction signal DS, the power-source control section 25 changes a power profile. Then, it starts a power supply to the tuner 21, the demodulation section 22, the AV-data processing section 23 and the microcomputer 24, so as to start each section. Thereafter, it stops the power supply to the standby tuner 27 from the power-source circuit 26. Consequently, the set-top box 15 is switched from sleep mode to power-on mode.

Hence, in this embodiment, when the power supply to the tuner 21, the demodulation section 22, the AV-data processing section 23 and the microcomputer 24 is not delivered by the power-source control section 25, using a frequency other than the specific frequency which is received by the tuner 21, the start signal AS which is transmitted from the head end 10 is received by the standby tuner 27. If the start signal AS is a start signal which corresponds to the group that the set-top box 15 belongs to, the standby tuner 27 outputs the power-supply instruction signal DS. In response to the power-supply instruction signal DS, the power-source control section 25 delivers a power supply to the tuner 21, the demodulation section 22, the AV-data processing section 23 and the microcomputer 24. Therefore, in sleep mode where no cable broadcast is supposed to be received, only a power supply to the standby tuner 27 is delivered without turning on the power of the tuner 21, the demodulation section 22, the AV-data processing section 23 and the microcomputer 24. This helps keep the power consumption of the set-top box 15 to a minimum requirement.

Furthermore, as the start signal AS, there are used the carrier signals C1 to C8 within the frequency band except the upstream data channel, the downstream data channel, the analog broadcasting channel and the digital broadcasting channel which are received by the tuner 21. Therefore, without affecting an ordinary cable broadcast and interactive communication, the start signal AS can be transmitted from the head end 10 at an arbitrary time. This makes it possible to switch, at an arbitrary time, a set-top box which belongs to any group from sleep mode to power-on mode.

Moreover, a set-top box can be switched for each group from sleep mode to power-on mode. Therefore, downstream data, or the like, can be transmitted at a different time for each group. This helps use traffic efficiently in the cable network 14.

Herein, in the above description, a case is mentioned where a set-top box which belongs to a specific group is switched from sleep mode to power-on mode. The number of carrier signals is not limited especially to the above described example, and thus, various changes can be made. Using only a single carrier signal, all the set-top boxes which are connected to the cable network 14 may also be switched from sleep mode to power-on mode. Or, using as many carrier signals as individual set-top boxes can be specified, the set-top boxes may also be separately switched from sleep mode to power-on mode.

Next, an example will be described of an operation in which the above described set-top box 15 is switched at a designated time from sleep mode to power-on mode. For example, let's assume a case where the start time is set at one-hour intervals during the period of 0 to 24 hours, in other words, 24 pieces of start time are set. Among the carrier signals C1 to C122, five carrier signals or 5-bit data are further used. Thereby, 24 pieces of start time can be expressed, thus stacking start-time information inside of the start signal AS.

In this case, the head end 10 outputs the eight carrier signals C1 to C8 as well as the five carrier signals C9 to C13 for specifying the start-time information as the start signal AS, via the RF synthesis section 13 and the cable network 14, to the set-top box 15. Also, the carrier detection section shown in FIG. 3 is formed by the thirteen carrier detection sections which detect the thirteen carrier signals C1 to C13. The decoder 71 is designed to output the power-supply instruction signal DS, only in the case where all the digital data D1 to D8 of the eight carrier detection sections for specifying a group is at a high level. It is also designed to decode the digital data D9 to D13 of the remaining five carrier detection sections, and then, output the start-time information which expresses the start time that is specified according to the digital data D9 to D13.

At this time, in the set-top box 15, the power supply from the power-source circuit 26 to the tuner 21, the demodulation section 22, the AV-data processing section 23 and the microcomputer 24 is being stopped by the power-source control section 25. Only a power supply is being delivered to the standby tuner 27. Therefore, the carrier detection section of the standby tuner 27 detects the eight carrier signals C1 to C8 and outputs the high-level digital data D1 to D8 to the decoder 71. Also, it outputs, to the decoder 71, whether or not there are the five carrier signals C9 to C13 as the digital data D9 to D13. The decoder 71 decodes the high-level digital data D1 to D8 and outputs the power-supply instruction signal DS. It also outputs the start-time information which is specified according to the digital data D9 to D13. For example, if the digital data D9 to D13 is "0, 0, 0, 0, 1", the decoder 71 outputs, to the power-source control section 25, a signal which indicates one o'clock as the start-time information. If it is "1, 0, 0, 0, 0", it outputs a signal which indicates 16:00 as the start-time information to the power-source control section 25.

The power-source control section 25 receives the power-supply instruction signal DS and the start-time information. When it refers to an internal clock function and recognizes that the current time has become the start-time information, it changes the power profile. Then, it stops the power supply to the standby tuner 27 from the power-source circuit 26. At the same time, it starts the power supply to the tuner 21, the demodulation section 22, the AV-data processing section 23 and the microcomputer 24. As a result, at the start time which is commanded by the head end 10, the set-top box 15 is switched from sleep mode to power-on mode.

Hence, in the above described example, according to the start-time information which is included in the received start signal AS, a power supply can be executed to the tuner 21, the demodulation section 22, the AV-data processing section 23 and the microcomputer 24. This makes it possible to switch at an arbitrary time from sleep mode to power-on mode.

Herein, the time information is not limited especially to the above described example. Instead of the above described start-time information, delay-time information may also be transmitted which specifies a delay time from the time when the start signal AS is received until the time when a power supply starts. In that case, after the delay time elapses from the time when the start signal AS is received, a power supply can be delivered to the tuner 21, the demodulation section 22, the AV-data processing section 23 and the microcomputer 24. Therefore, at an optional time after a start signal is transmitted, switching can be executed from sleep mode to power-on mode.

Furthermore, if a delay time can be predetermined, a timer which can clock the delay time may also be provided beforehand in the standby tuner 27 or the power-source control section 25. Thereby, a start signal which includes no delay-time information is transmitted to start the timer. After the delay time passes, switching can be executed from sleep mode to power-on mode.

Moreover, in this embodiment, in the power-on mode, after a power supply to the tuner 21, or the like is started to start each section, the power supply stops from the power-source circuit 26 to the standby tuner 27. However, a power supply may also be executed to the standby tuner 27. In that case, the set-top box 15 can be switched from power-on mode to sleep mode in the following way.

For example, a bit needs to be added which specifies a stop signal TS for switching the set-top box 15 from the power-on mode to the sleep mode. In order to do that, one more carrier signal or 1-bit data is used from among the carrier signals C1 to C122. Thereby, if such a bit is at a high level, the fact that a signal which is transmitted from the head end 10 is the stop signal TS can be specified. In this case, if the bit is at a low level, the fact that a signal which is transmitted from the head end 10 is the start signal AS may also be specified.

First, in addition to the eight carrier signals C1 to C8 as the stop signal TS, the head end 10 outputs a carrier signal C9 for specifying that such a signal is the stop signal TS, via the RF synthesis section 13 and the cable network 14, to the set-top box 15. At this time, power is also supplied to the standby tuner 27, so that the standby tuner 27 can receive the stop signal TS from the head end 10.

In this case, the carrier detection section shown in FIG. 3 is formed by nine carrier detection sections which detect the nine carrier signals C1 to C9. The decoder 71 outputs a power-supply stop signal SS, only in the case where all the digital data D1 to D8 of the eight carrier detection sections for specifying a group are at a high level, and the digital data D9 of the remaining single carrier detection section which indicates a stop signal is at a high level.

At this time, in response to the power-supply stop signal SS, the power-source control section 25 stops the power supply to the tuner 21, the demodulation section 22, the AV-data processing section 23 and the microcomputer 24 from the power-source circuit 26. Then, it continues the power supply only to the standby tuner 27. Therefore, the set-top box 15 is switched from the power-on mode to the sleep mode.

Hence, if the power is supplied not only to the tuner 21, the demodulation section 22, the AV-data processing section 23 and the microcomputer 24, but also to the standby tuner 27, by the power-source control section 25, then using a frequency other than the specific frequency which is received by the tuner 21, the stop signal TS which is transmitted from the head end 10 is received by the standby tuner 27. At this time, if the stop signal TS is a stop signal which corresponds to the group that the set-top box 15 belongs to, the standby tuner 27 outputs the power-supply stop signal SS. In response to the power-supply stop signal SS, the power-source control section 25 halts the power supply to the tuner 21, the demodulation section 22, the AV-data processing section 23 and the microcomputer 24. This makes it possible to switch the set-top box 15 from power-on mode to sleep mode. Therefore, using the head end 10, in the middle of the night, the set-top box 15 is switched from sleep mode to power-on mode. Thereafter, when a user forgets to switch the set-top box 15 into sleep mode, or at another such time, the set-top box 15 can be automatically switched from power-on mode to sleep mode. This prevents the set-top box 15 from wasting power.

Herein, as described above, in the case where the set-top box 15 is automatically switched from power-on mode to sleep mode, before it is automatically switched to sleep mode, a display apparatus may also display a confirmation image for confirming permission to switch from power-on mode to sleep mode. In that case, only in the case where a user executes a predetermined confirmation operation using the confirmation image, switching is automatically executed from power-on mode to sleep mode. In this case, while a user is viewing a cable broadcast using the set-top box 15, switching can be prevented from being automatically executed to sleep mode.

In addition, the method of specifying a stop signal is not limited especially to the above described example, and thus, various changes can be made. Unless a start signal is used, a bit for specifying a stop signal may also be omitted.

Furthermore, the method of switching from power-on mode to sleep mode after switching is automatically executed from sleep mode to power-on mode is not limited especially to the above described example in which a stop signal is used. For example, after a predetermined time elapses from the time when switching is executed to power-on mode, or after a certain quantity of downstream data, the power-source control section 25 may also automatically switch from power-on mode to sleep mode.

Moreover, in each description described above, the power of the set-top box 15 is turned on or off. However, how to control a power-supply state is not limited especially to this example. A power supply may also be gradually increased or decreased, so that the power supply can be controlled step by step. Or, the power may also be supplied or stopped, one after another, to a predetermined circuit. In this case, the power supply can be partially controlled.

Figure 6:
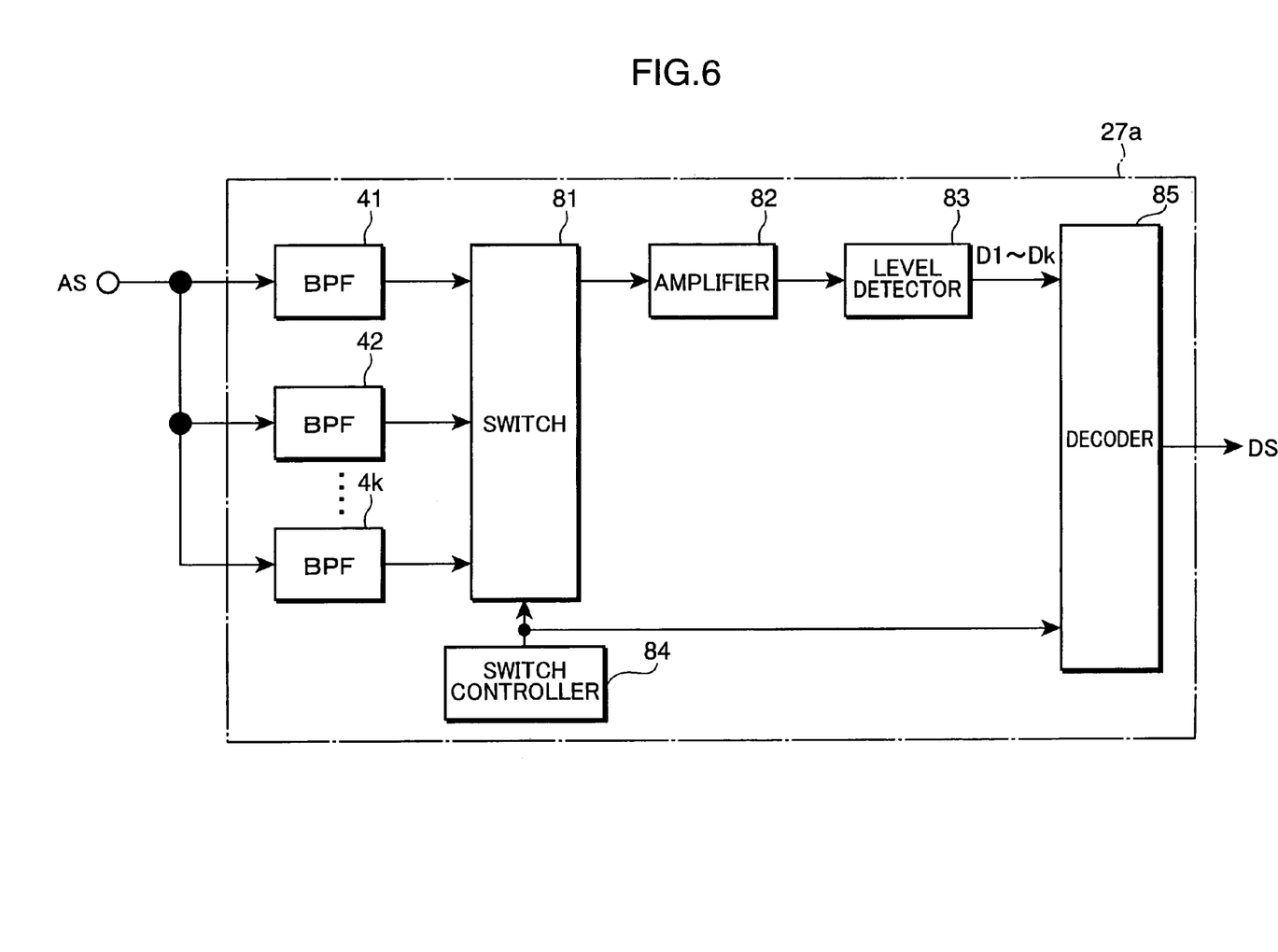
FIG. 6 is a block diagram, showing another example of the standby tuner shown in FIG. 2.

Next, another configuration of the standby tuner shown in FIG. 2 will be described. FIG. 6 is a block diagram, showing another example of the standby tuner shown in FIG. 2. A standby tuner 27a shown in FIG. 6 includes: a plurality of BPFs 41 to 4k; a switch 81; an amplifier 82; a level detector 83; a switch controller 84; and a decoder 85.

The BPFs 41 to 4k are provided for k-piece carrier signals C1 to Ck, respectively, which are transmitted from the head end 10 as the start signal AS. The BPF 41 allows only the carrier signal C1 to pass through. The other BPFs 42 to 4k are also configured in the same way as described above, except for the fact that they have a different passing band. Hence, they operate in the same way. The switch 81 is controlled by the switch controller 84. It switches each output of the BPFs 41 to 4k and leads each output, one by one, to the amplifier 82. The amplifier 82 amplifies each output of the BPFs 41 to 4k, one after another, at a predetermined amplification factor. If each amplified signal is beyond a predetermined level, the level detector 83 outputs the detection-result signals D1 to Dk, one by one.

In addition, in synchronization with switching timing of the switch 81, the switch controller 84 outputs, to the decoder 85, a BPF specification signal for specifying which BPF signal is outputted by the switch 81. According to the BPF specification signal, the decoder 85 successively decodes the detection-result signals D1 to Dk which are outputted from the level detector 83. If the detection-result signals D1 to Dk are the start signal for switching the set-top box 15 from sleep mode to power-on mode, it outputs the power-supply instruction signal DS. In contrast, if the detection-result signals D1 to Dk are the start signal for switching the other set-top boxes from sleep mode to power-on mode, it does not output the power-supply instruction signal DS. In this example, the BPFs 41 to 4k correspond to an example of the filter means; the switch 81 and the switch controller 84, an example of the choosing means; the amplifier 82 and the level detector 83, an example of the wave-detecting means; and the decoder 85, an example of the extracting means.

In this case, the same advantages can be obtained as the case where the standby tuner 27 shown in FIG. 3 is used. Also, the amplifier 82 and the level detector 83 are used in common with the plurality of BPFs 41 to 4k. This helps simplify the circuit configuration of the standby tuner 27a.

Figure 7:
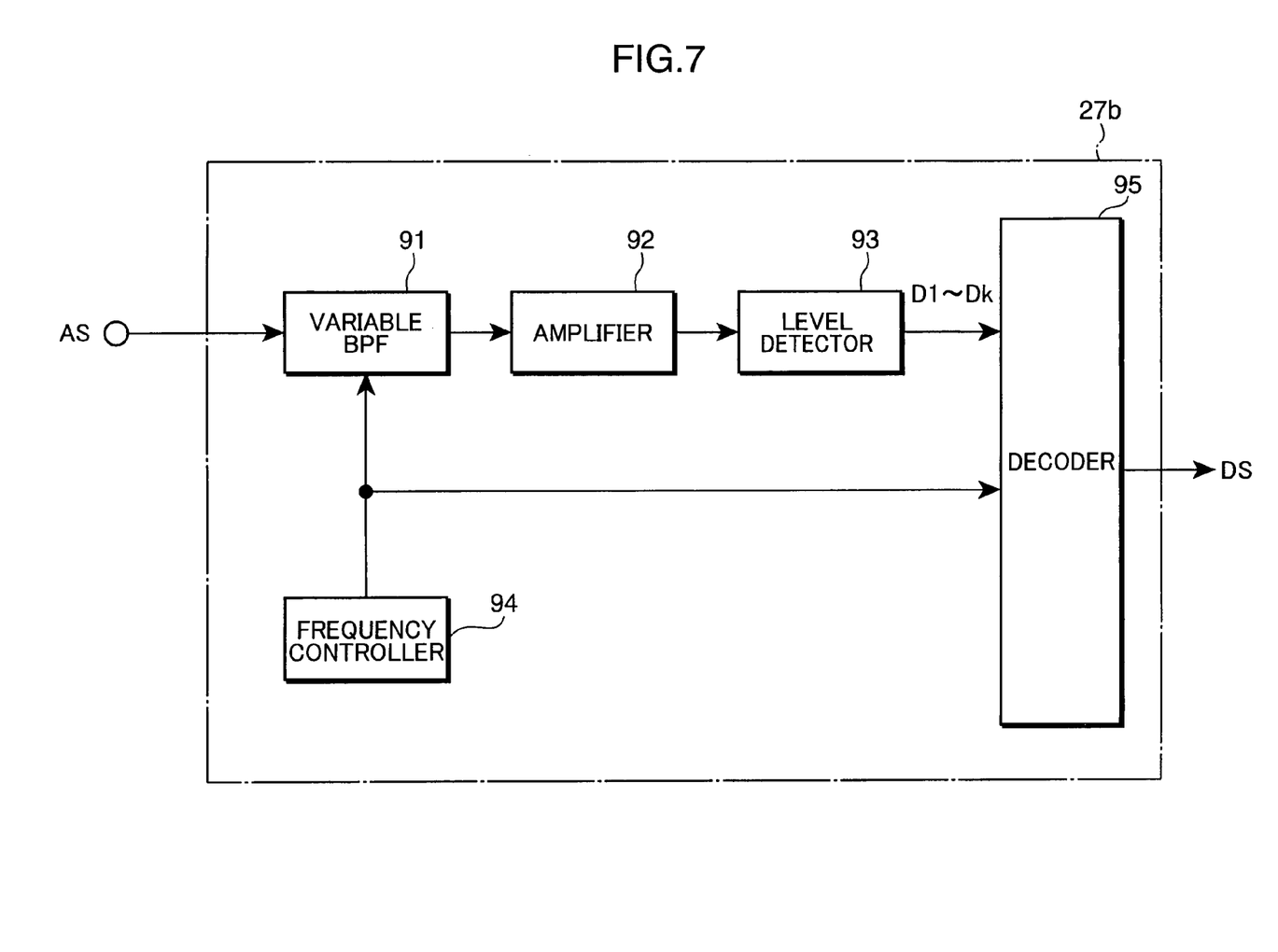
FIG. 7 is a block diagram, showing still another example of the standby tuner shown in FIG. 2.

FIG. 7 is a block diagram, showing still another example of the standby tuner shown in FIG. 2. A standby tuner 27b shown in FIG. 7 includes: a variable BPF 91; an amplifier 92; a level detector 93; a frequency controller 94; and a decoder 95.

The frequency controller 94 successively controls the passing frequency band of the variable BPF 91, so that at each frequency of the k-piece carrier signals C1 to Ck which are transmitted from the head end 10 as the start signal AS, each carrier signal can pass through, one after another. The variable BPF 91 is configured so as to change the passing frequency band. It allows only a carrier signal with a frequency which is designated in the frequency controller 94 to pass through, one by one. The amplifier 92 amplifies the output of the variable BPF 91, one after another, at a predetermined amplification factor. If each amplified signal is beyond a predetermined level, the level detector 93 outputs the detection-result signals D1 to Dk, one by one.

In addition, in synchronization with passing frequency-band switching timing of the variable BPF 91, the frequency controller 94 outputs, to the decoder 95, a carrier specification signal for specifying which carrier signal is outputted by the variable BPF 91. According to the carrier specification signal, the decoder 95 successively decodes the detection-result signals D1 to Dk which are outputted from the level detector 93. If the detection-result signals D1 to Dk are the start signal for switching the set-top box 15 from sleep mode to power-on mode, it outputs the power-supply instruction signal DS. In contrast, if the detection-result signals D1 to Dk are the start signal for switching the other set-top boxes from sleep mode to power-on mode, it does not output the power-supply instruction signal DS. In this example, the variable BPF 91 corresponds to an example of the variable filter means; the frequency controller 94, an example of the controlling means; the amplifier 92 and the level detector 93, an example of the wave-detecting means; and the decoder 95, an example of the extracting means.

In this case, the same advantages can be obtained as the case where the standby tuner 27 shown in FIG. 3 is used. Besides, the k-piece carrier signals C1 to Ck can be detected using the single variable BPF 91, the amplifier 92 and the level detector 93. This helps simplify the circuit configuration of the standby tuner 27b.

Herein, in the above described description, an example is given using a set-top box for the CATV system in the United States. However, the present invention is not limited especially to this example. It can be applied, in the same way, to a set-top box for a CATV system in another nation, such as Japan and European countries. Hence, the same advantages can be obtained.

Furthermore, a TV broadcasting system to which the present invention is applied is not limited especially to the above described CATV system. It can also be applied to a television broadcasting system, or the like, which transmits a ground-wave broadcast, a satellite broadcast, or the like. This can also produce the same advantages.

As described so far, according to the present invention, the power-supply state of a receiving apparatus is changed at an arbitrary time, so that its power consumption can be sufficiently reduced. Therefore, it can be suitably used for a receiving apparatus which receives a broadcast signal from a broadcasting-station apparatus, a display apparatus and a television broadcasting system which are provided with this receiving apparatus, and the like.

The invention claimed is:

1. A receiving apparatus for use with a broadcasting-station apparatus, said receiving apparatus comprising:
   a first receiving section for receiving a signal transmitted from the broadcasting-station apparatus, the signal having a broadcast carrier frequency;
   a power-supply controlling section for controlling a power supply to said first receiving section; and
   a second receiving section for receiving an operation signal transmitted from the broadcasting-station apparatus, the operation signal including a plurality of carrier signals having different frequencies within a frequency band, the plurality of carrier signals included in the operation signal having frequencies different from the broadcast carrier frequency,
   wherein said second receiving section outputs a power-supply control signal to said power-supply controlling section according to the plurality of carrier signals included in the operation signal, and
   wherein said power-supply controlling section supplies power to said first receiving section according to said power-supply control signal.

2. The receiving apparatus according to claim 1,
   wherein said second receiving section is configured to receive a start signal transmitted, using a frequency different from the broadcast carrier frequency, from the broadcasting-station apparatus as the operation signal if power is not being supplied by said power-supply controlling section, and configured to output a power-supply instruction signal according to the start signal as said power-supply control signal, and
   wherein said power-supply controlling section supplies power to said first receiving section according to said power-supply instruction signal.

3. The receiving apparatus according to claim 2,
   wherein said receiving apparatus belongs to a group of a plurality of groups of receiving apparatuses,
   wherein the start signal includes group specification information for specifying a group of the plurality of groups of receiving apparatuses, and
   wherein said second receiving section is configured to output said power-supply instruction signal to said power-supply controlling section if said second receiving section receives the start signal including the group specification information specifying the group of the plurality of groups.

4. The receiving apparatus according to claim 3, wherein the start signal includes a plurality of carrier signals having different frequencies, the plurality of carrier signals included in the start signal having frequencies different from the broadcast carrier frequency, said second receiving section comprising:
a plurality of wave-detecting sections for detecting the plurality of carrier signals, respectively, included in the start signal; and
an extracting section for extracting information included in the start signal based on a detection result by said plurality of wave-detecting sections of the plurality of carrier signals included in the start signal.

5. The receiving apparatus according to claim 4, wherein said plurality of wave-detecting sections are configured to produce digital data as said detection result, and
wherein said extracting section is configured to output said power-supply instruction signal to said power-supply controlling section if said digital data of said detection result by said plurality of wave-detecting sections coincides with the group specification information.

6. The receiving apparatus according to claim 3, wherein the start signal includes a plurality of carrier signals having different frequencies, the plurality of carrier signals included in the start signal having frequencies different from the broadcast carrier frequency, said second receiving section comprising:
a plurality of filter sections for filtering the plurality of carrier signals, respectively, included in the start signal;
a choosing section for consecutively choosing and outputting an output of one filter section from among said plurality of filter sections;
a wave-detecting section for consecutively detecting a carrier signal of the plurality of carrier signals, said carrier signal being output from said one filter section chosen by said choosing section; and
an extracting section for extracting information included in the start signal based on a detection result by said wave-detecting section of the plurality of carrier signals.

7. The receiving apparatus according to claim 3, wherein the start signal includes a plurality of carrier signals having different frequencies within a frequency band, the plurality of carrier signals included in the start signal having frequencies different from the broadcast carrier frequency, said second receiving section comprising:
a variable filter section having a variable passing frequency band;
a controlling section for controlling said passing frequency band of said variable filter section so that the plurality of carrier signals included in the start signal pass through said variable filter section consecutively;
a wave-detecting section for consecutively detecting a carrier signal of the plurality of carrier signals, said carrier signal being passed through said variable filter section; and
an extracting section for extracting information included in the start signal based on a detection result by said wave-detecting section of the plurality of carrier signals.

8. The receiving apparatus according to claim 2, wherein the start signal further includes time information for specifying a time when said first receiving section should be started,
wherein said second receiving section extracts the time information included in the start signal, and outputs the time information and said power-supply instruction signal to said power-supply controlling section, and
wherein said power-supply controlling section supplies power to said first receiving section at the time specified by the time information.

9. The receiving apparatus according to claim 2, said first receiving section comprising:
a tuner section for receiving the signal having the broadcast carrier frequency;
a demodulation section for demodulating the signal received by said tuner section;
a conversion section for converting the signal demodulated by said demodulation section into a visual signal and an audio signal; and
a control section for controlling an operation of said tuner section, said demodulation section, and said conversion section,
wherein said power-supply controlling section does not supply power to said tuner section, said demodulation section, said conversion section, and said control section before said second receiving section receives the start signal.

10. The receiving apparatus according to claim 2, wherein said power-supply controlling section does not supply power to said second receiving section while supplying power to said first receiving section.

11. A display apparatus comprising:
the receiving apparatus according to claim 1; and
a displaying section for displaying a broadcast image received by said receiving apparatus.

12. The display apparatus according to claim 11, wherein said second receiving section is configured to receive a start signal transmitted, using a frequency different from the broadcast carrier frequency, from the broadcasting-station apparatus as the operation signal if power is not being supplied by said power-supply controlling section, and configured to output a power-supply instruction signal according to the start signal as said power-supply control signal, and
wherein said power-supply controlling section supplies power to said first receiving section according to said power-supply instruction signal.

13. The display apparatus according to claim 11, wherein said power-supply controlling section does not supply power to said first receiving section and said displaying section before said second receiving section receives the start signal.

14. A television broadcasting system comprising:
a broadcasting-station apparatus that transmits a signal with a broadcast carrier frequency; and
at least one receiving apparatus according to claim 1.

15. The television broadcasting system according to claim 14, wherein said second receiving section in said at least one receiving apparatus is configured to receive a start signal transmitted, using a frequency different from said broadcast carrier frequency, from said broadcasting-station apparatus as said operation signal if power is not being supplied by said power-supply controlling section in said at least one receiving apparatus, and configured to output a power-supply instruction signal according to said start signal as said power-supply control signal, and wherein said power-supply controlling section in said at least one receiving apparatus supplies power to said first receiving section in said at least one receiving apparatus according to said power-supply instruction signal.

16. A receiving apparatus for use with a broadcasting-station apparatus, said receiving apparatus comprising:
- a first receiving section for receiving a signal with a specific frequency which is transmitted from the broadcasting-station apparatus;
- a power-supply controlling section for controlling a power supply to said first receiving section; and
- a second receiving section for receiving an operation signal which is transmitted from the broadcasting-station apparatus using a frequency other than the specific frequency, wherein said second receiving section outputs a power-supply control signal to said power-supply controlling section according to the operation signal, wherein said power-supply controlling section controls a power supply to said first receiving section according to said power-supply control signal, wherein said second receiving section is configured to receive a stop signal transmitted from the broadcasting-station apparatus as the operation signal if power is being supplied by said power-supply controlling section, and for outputting a power-supply stop signal according to the stop signal as said power-supply control signal, and wherein said power-supply controlling section stops the power supply to said first receiving section according to said power-supply stop signal.

* * * * *